United States Patent
Kato et al.

(10) Patent No.: US 10,654,524 B2
(45) Date of Patent: May 19, 2020

(54) VEHICLE BODY FRONT STRUCTURE

(71) Applicant: HONDA MOTOR CO., LTD., Tokyo (JP)

(72) Inventors: Yasuyuki Kato, Wako (JP); Sadayuki Asano, Wako (JP); Tomohide Sekiguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 155 days.

(21) Appl. No.: 15/960,053

(22) Filed: Apr. 23, 2018

(65) Prior Publication Data

US 2018/0304931 A1    Oct. 25, 2018

(30) Foreign Application Priority Data

Apr. 25, 2017    (JP) .................. 2017-086049

(51) Int. Cl.
*B62D 21/15* (2006.01)
*B62D 25/04* (2006.01)
*B62D 25/08* (2006.01)

(52) U.S. Cl.
CPC .......... *B62D 21/152* (2013.01); *B62D 25/04* (2013.01); *B62D 25/08* (2013.01); *B62D 21/15* (2013.01)

(58) Field of Classification Search
CPC ...... B62D 21/15; B62D 21/152; B62D 25/04; B62D 25/08
USPC .................................................. 296/187.1
See application file for complete search history.

(56) References Cited

U.S. PATENT DOCUMENTS

2015/0035316 A1*  2/2015  Kuriyama ............ B62D 25/082
                                                296/187.1

FOREIGN PATENT DOCUMENTS

| JP | 2003-237622 | A |   | 8/2003 |
|----|-------------|---|---|--------|
| JP | 2003237622  | A | * | 8/2003 |
| JP | 2005-161938 | A |   | 6/2005 |
| JP | 2012-187948 |   |   | 10/2012 |
| JP | 2014-162361 | A |   | 9/2014 |

OTHER PUBLICATIONS

Japanese Office Action with English translation, dated Oct. 16, 2018, 6 pages.

* cited by examiner

*Primary Examiner* — Joseph D. Pape
*Assistant Examiner* — Dana D Ivey
(74) *Attorney, Agent, or Firm* — Rankin, Hill & Clark LLP

(57) ABSTRACT

A vehicle body front structure includes: a front pillar that includes an A-pillar provided to extend in an up-down direction, an A'-pillar provided to extend in the up-down direction in the rear of the A-pillar, and a lower frame disposed between lower ends of the A-pillar and the A'-pillar; and a bracket connected to the lower end of the A-pillar and provided to extend frontward from the lower end of the A-pillar. In the vehicle body front structure, strength of the bracket is set to be lower than strength of the A-pillar.

10 Claims, 5 Drawing Sheets

VEHICLE BODY FRONT STRUCTURE

CROSS-REFERENCE TO RELATED APPLICATION

This application is based upon and claims priority from the Japanese Patent Application No. 2017-086049, filed on Apr. 25, 2017, the entire contents of which are incorporated herein by reference.

BACKGROUND OF THE INVENTION

1. Field of the Invention

The present invention relates to a vehicle body front structure of a vehicle.

2. Description of the Related Art

For example, Patent document 1 (Japanese Unexamined Patent Application Publication No. 2014-162361) discloses a structure that allows a front pillar of a vehicle to be divided into a first front pillar on a front side (what is called an A-pillar) and a second front pillar on a rear side (what is called an A'-pillar).

The vehicle body front structure disclosed in Patent document 1 is configured to allow the A-pillar to be formed thinner than the A'-pillar for the purpose of securing a visual field, and to allow a load in front collision to be transmitted mostly to the A'-pillar. Therefore, the strength of the A-pillar is set to be lower than the strength of the A'-pillar. However, part of the front collision load is transmitted to the A-pillar, and thus it has been demanded to suppress bending of the A-pillar even if the A-pillar is thinly formed.

The present invention has therefore been made in view of the above problem, and an object of the invention is to provide a vehicle body front structure that is, in a structure allowing a front pillar to be divided into a first front pillar on a front side and a second front pillar on a rear side, capable of suppressing bending of the first front pillar due to a front collision load.

SUMMARY OF THE INVENTION

In order to solve the above problem, according to an aspect of the present invention, a vehicle body front structure reflecting one aspect of the present invention includes: a front pillar that includes a first front pillar provided to extend in an up-down direction, a second front pillar provided to extend in the up-down direction in the rear of the first front pillar, and a lower frame disposed between lower ends of the first front pillar and the second front pillar; and a bracket that is connected to the lower end of the first front pillar and provided to extend frontward from the lower end of the first front pillar, wherein strength of the bracket is set to be lower than strength of the first front pillar.

BRIEF DESCRIPTION OF THE DRAWINGS

The features and advantages provided by one or more embodiments of the invention will become apparent from the detailed description given below and appended drawings which are given only by way of illustration, and thus are not intended as a definition of the limits of the present invention.

DETAILED DESCRIPTION OF THE PREFERRED EMBODIMENTS

Hereinafter, one or more embodiments of the present invention will be described in detail with reference to the drawings, taking the case for example, where a vehicle body front structure according to the present invention is applied to an upper member, a front pillar and its periphery on the left side of the vehicle. In the description below, the same component is given the same reference sign and thus repetitive description thereof is omitted. Note that "front-rear", "up-down", and "right-left" depicted by arrow marks in each figure indicate a front-rear direction of the vehicle body, an up-down direction of the vehicle body, and a right-left direction (vehicle width direction) viewed from a driver's seat, respectively.

Figure 1:
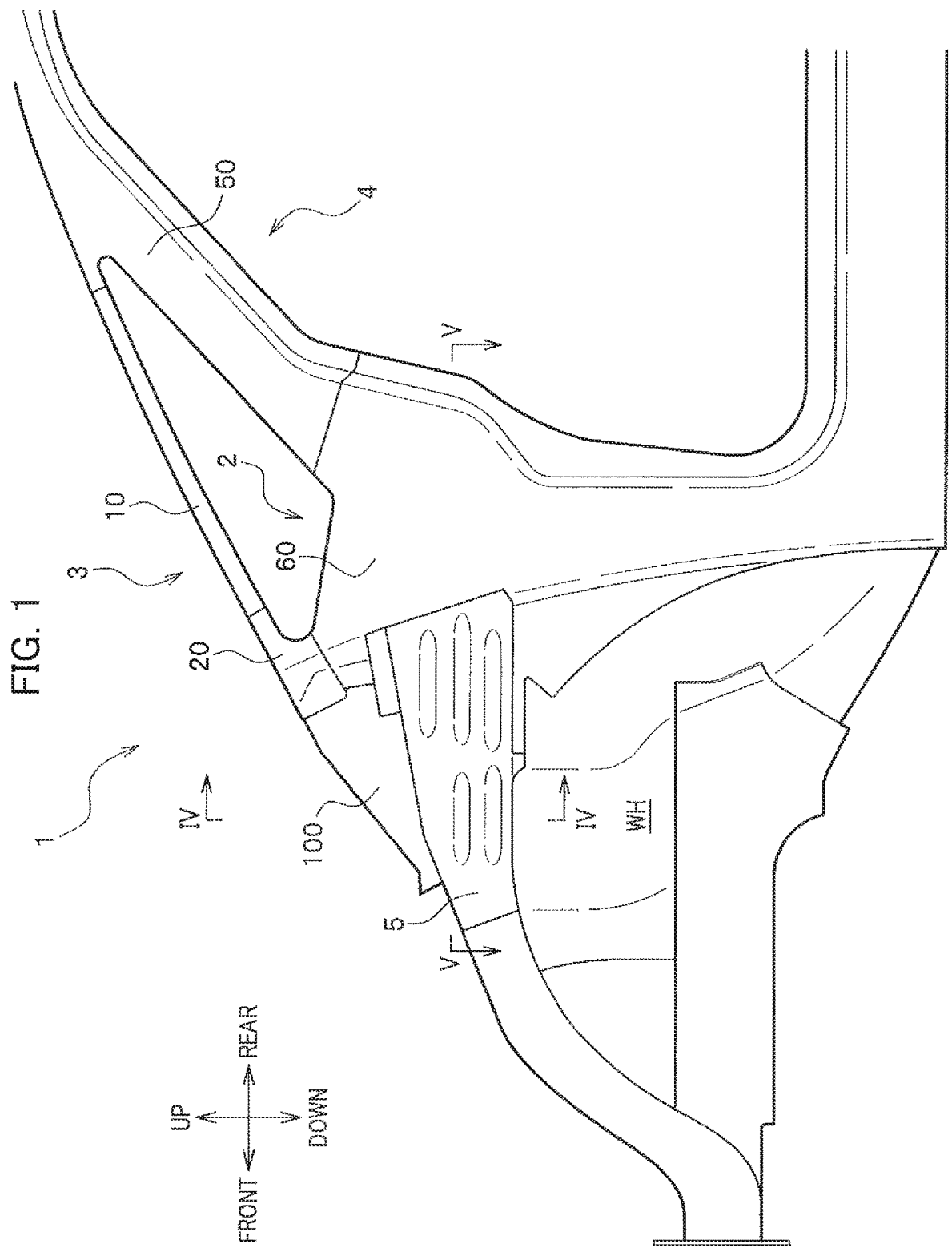
FIG. 1 is a side view showing a vehicle body front structure according to an embodiment of the present invention, which is viewed from the outside in a vehicle width direction.
Figure 2:
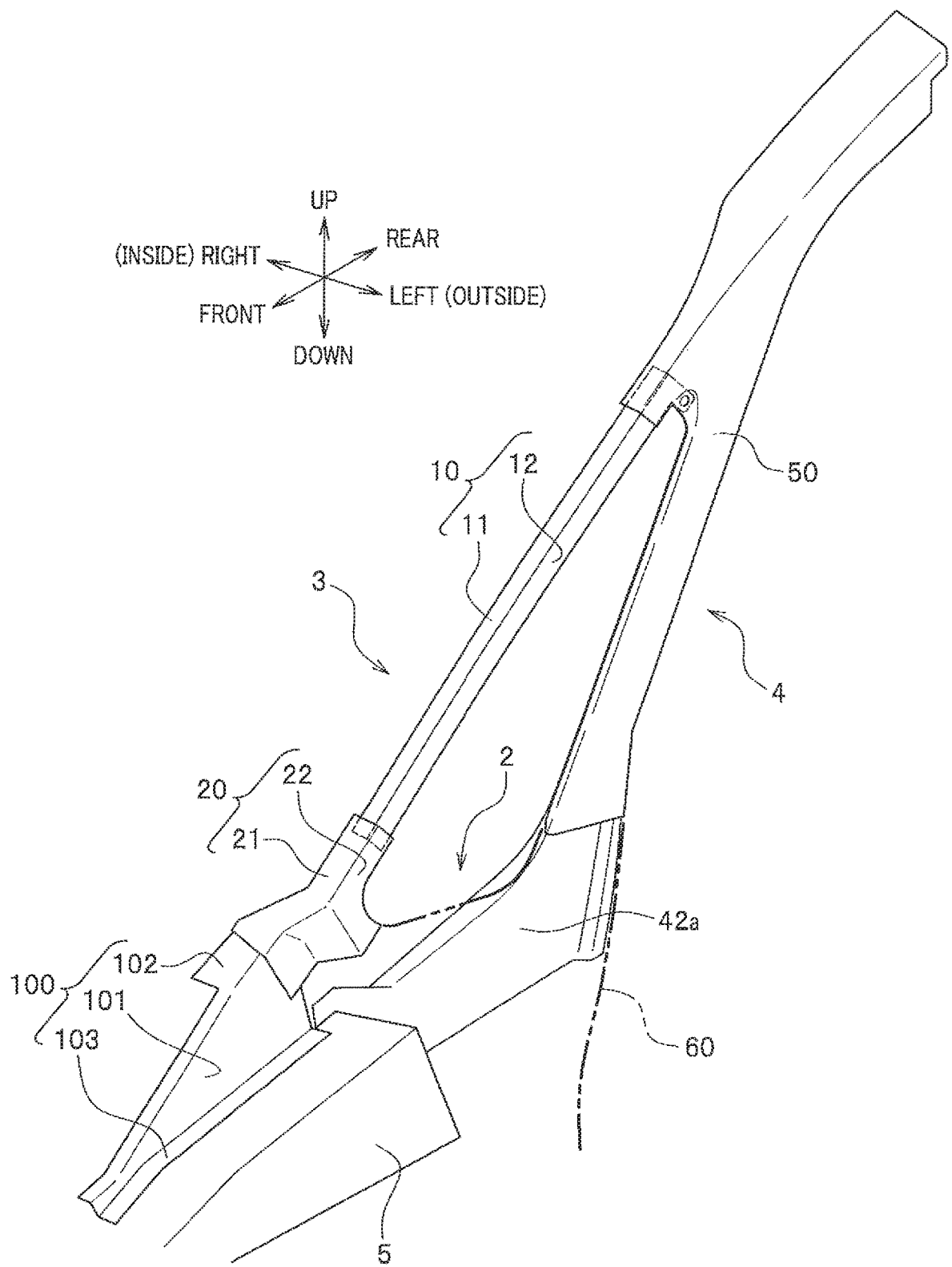
FIG. 2 is a perspective view showing a front pillar, an upper member and a bracket according to the embodiment of the present invention.

As shown in FIG. 1 and FIG. 2, a vehicle body front structure 1 according to an embodiment of the present invention is provided with a front pillar, an upper member 5 provided above a wheel house WH and connected to the front pillar, and a bracket 100 provided between the front pillar and the upper member 5. Moreover, the vehicle body front structure 1 is provided, for the front pillar, with a lower frame 2, an A-pillar (first front pillar) 3 on a front side provided to extend upward from a front end of the lower frame 2, and an A'-pillar (second front pillar) 4 on a rear side provided to extend upward from a rear end of the lower frame 2. That is, lower ends of the A-pillar 3 and the A'-pillar 4 provided to extend in the up-down direction, respectively, are connected to each other through the lower frame 2 disposed between the lower ends. Moreover, upper ends of the A-pillar 3 and the A'-pillar 4 are connected to each other. That is, the A-pillar 3, the A'-pillar 4 and the lower frame 2 form a frame body for an opening having a triangular shape in side view. Moreover, a front windshield glass (not shown) is provided between a pair of right and left A-pillars 3, namely, within the opening. Further, a side glass (not shown) is provided between the A-pillar 3 and the A'-pillar 4.

<A-Pillar>

The A-pillar 3 is configured separately from the A'-pillar 4 and the lower frame 2, and provided with an inclination so as to extend upward as it goes toward the rear side. The inclination of the A-pillar 3 is larger than the inclination of the A'-pillar 4 to be described below.

The A-pillar 3 is formed to be thinner than the A'-pillar 4 when viewed from an occupant (for example, a driver) of the vehicle. Moreover, strength (tensile strength) of the A-pillar 3 is set to be greater than strength (tensile strength) of the A'-pillar 4. Settings of the thinness and tensile strengths can be embodied by suitably selecting tensile strengths of a high-tension material (super high tensile strength steel plate) for each member composing the A-pillar 3 and the A'-pillar 4.

Herein, for example, an air bag device provided on the front passenger seat side is, in its operation, first inflated upward, then hit against the front windshield glass, and inflated toward the front passenger seat. The A-pillar 3 in the vehicle body front structure 1 according to the embodiment of the present invention is adapted to achieve both securing of a visual field caused by its thinness and strength of the A-pillar 3 which is at the level not impeding inflation of the air bag device.

Figure 3:
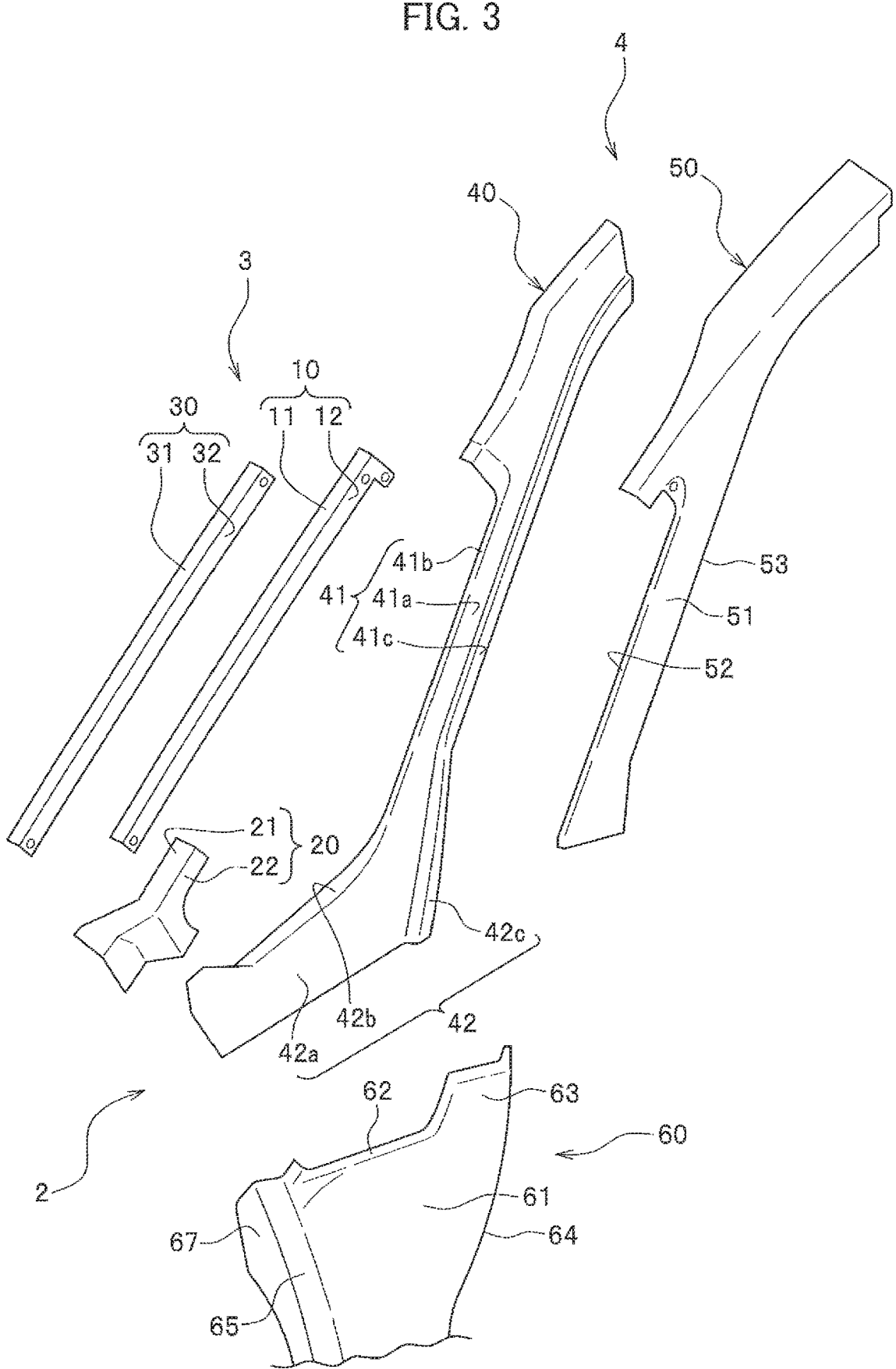
FIG. 3 is an exploded perspective view showing the front pillar according to the embodiment of the present invention.

As shown in FIG. 3, the A-pillar 3 is provided with an A-pillar body 10 composing a main part of the A-pillar 3, a lower end member 20 composing a lower end of the A-pillar 3, and a stiffener 30 serving as a reinforcing member that reinforces the A-pillar body 10.

<<A-Pillar Body>>

The A-pillar body 10 is integrally provided with an upper wall part 11, and an outer wall part 12 provided to extend downward from an outer end in the vehicle width direction of the upper wall part 11, and consists of a metal member or a Fiber Reinforced Plastics (FRP, e.g., Carbon Fiber Reinforced Plastics (CFRP), Glass Fiber Reinforced Plastics (GFRP), or the like) member that has an L-shape form when viewed in the direction of an axis line thereof. The A-pillar body 10 is an example of an A-pillar outer member that composes an outer part in the vehicle width direction of the A-pillar 3.

A front and lower end of the A-pillar body 10 is joined to a rear and upper end of the lower end member 20 by welding or the like, and a rear and upper end of the A-pillar body 10 is joined to an A'-pillar outer member 50 by welding or the like.

<<Lower End Member>>

The lower end member 20 is integrally provided with an upper wall part 21, and an outer wall part 22 provided to extend downward from an outer end in the vehicle width direction of the upper wall part 21, and consists of a metal member or a fiber reinforced plastics member that has the form of L-shape when viewed in the direction of an axis line thereof. A front end of the lower end member 20 is joined to an upper part of a rear end of the bracket 100 by welding or the like. A lower end of the lower end member 20 is joined to a front part of an upper end of a lower frame outer member 60 by welding or the like. The rear and upper end of the lower end member 20 is joined to the front and lower end of the A-pillar body 10 by welding or the like. The lower end member 20 is a member configured separately from the A-pillar body 10 in order to obtain a form which makes it possible to fix the lower end of the A-pillar 3 to both of the lower frame 2 and the bracket 100, and has substantially the same tensile strength as that of the A-pillar body 10.

<<Stiffener>>

The stiffener 30 consists of a metal member or a fiber reinforced plastics member that is along the A-pillar body 10 and has an L-shape form when viewed in the direction of an axis line thereof, and which is attached to the inner side in the vehicle width direction of the A-pillar body 10. The stiffener 30 is an example of an A-pillar inner member that composes an inner part in the vehicle width direction of the A-pillar 3. The stiffener 30 is integrally provided with an upper wall part 31 that is along the upper wall part 11 of the A-pillar body 10, and an outer wall part 32 that is along the outer wall part 12 of the A-pillar body 10 and provided to extend downward from an outer end in the vehicle width direction of the upper wall part 31. The upper wall part 31 of the stiffener 30 is joined to the upper wall part 11 of the A-pillar body 10 by welding or the like, and the outer wall part 32 of the stiffener 30 is joined to the outer wall part 12 of the A-pillar body 10 by welding or the like.

<A'-Pillar and Lower Frame>

As shown in FIG. 1 and FIG. 3, the A'-pillar 4 is provided in the rear of the A-pillar 3 and with an inclination so as to extend upward as it goes toward the rear side. The A'-pillar 4 has a more erect posture than the A-pillar 3. The lower frame 2 is provided to extend in the front-rear direction, and is a part that connects the lower ends of the A-pillar 3 and the A'-pillar 4 to each other.

As shown in FIG. 3, the vehicle body front structure 1 is provided, for members composing the A'-pillar 4 and the lower frame 2, with an inner member 40 composing a part located on the inner side in the vehicle width direction of the A'-pillar 4 and the lower frame 2, an A'-pillar outer member 50 composing a part located on the outer side in the vehicle width direction of the A'-pillar 4, and a lower frame outer member 60 composing a part located on the outer side in the vehicle width direction of the lower frame 2.

<<Inner Member>>

The inner member 40 is a metal member or a fiber reinforced plastics member that is integrally provided with an A'-pillar inner part 41 and a lower frame inner part 42. The A'-pillar inner part 41 is integrally provided with an inner wall part 41a composing an inner wall of the A'-pillar 4, a front wall part 41b provided to extend outward in the vehicle width direction from a front end of the inner wall part 41a and composing a front wall of the A'-pillar 4, and a rear wall part 41c provided to extend outward in the vehicle width direction from a rear end of the inner wall part 41a and composing a rear wall of the A'-pillar 4. The lower frame inner part 42 is integrally provided with an inner wall part 42a composing an inner wall of the lower frame 2, an upper wall part 42b provided to extend outward in the vehicle width direction from an upper end of the inner wall part 42a and composing an upper wall of the lower frame 2, and a rear wall part 42c provided to extend outward in the vehicle width direction from a rear end of the inner wall part 42a and composing a rear wall of the lower frame 2. The inner wall part 41a and the inner wall part 42a are continued each other in a sagittal direction. Moreover, the front wall part 41b and the upper wall part 42b are continued each other, and the rear wall part 41c and the rear wall part 42c are continued each other.

<<A'-Pillar Outer Member>>

The A'-pillar outer member 50 is a metal member or a fiber reinforced plastics member that is integrally provided with an outer wall part 51 composing an outer wall of the A'-pillar 4, a front wall part 52 provided to extend inward in the vehicle width direction from a front end of the outer wall part 51 and composing the front wall of the A'-pillar 4, and a rear wall part 53 provided to extend inward in the vehicle width direction from a rear end of the outer wall part 51 and composing the rear wall of the A'-pillar 4.

<<Lower Frame Outer Member>>

The lower frame outer member 60 is a metal member or a fiber reinforced plastics member that is integrally provided with an outer wall part 61 composing an outer wall of the lower frame 2, an upper wall part 62 provided to extend inward in the vehicle width direction from a front part of an upper end of the outer wall part 61 and composing the upper wall of the lower frame 2, a flange part 63 provided to extend upward from a rear part of the upper end of the outer wall part 61, a rear wall part 64 provided to extend inward in the vehicle width direction from a rear end of the outer wall part 61 and composing the rear wall of the lower frame 2, a front wall part 65 provided to extend inward in the vehicle width direction from a front end of the outer wall part 61 and composing a front wall of the lower frame 2, a flange part 66 (see FIG. 5) provided to extend rearward from an inner end in the vehicle width direction of the rear wall part 64, and a flange part 67 provided to extend frontward from an inner end in the vehicle width direction of the front wall part 65.

The front wall part 41b of the inner member 40 is joined to the front wall part 52 of the A'-pillar outer member 50 by welding or the like. The rear wall part 41c of the inner member 40 is joined to the rear wall part 53 of the A'-pillar outer member 50 by welding or the like. The rear end of the inner wall part 42a of the inner member 40 is joined to the flange part 66 of the lower frame outer member 60 by welding or the like. The front end of the inner wall part 42a of the inner member 40 is joined to the flange part 67 of the lower frame outer member 60 by welding or the like. The upper wall part 42b of the inner member 40 is joined to the upper wall part 62 of the lower frame outer member 60 by welding or the like. The rear wall part 42c of the inner member 40 is joined to the rear wall part 64 of the lower frame outer member 60 by welding or the like. The lower end of the outer wall part 51 of the A'-pillar outer member 50 is joined to the flange part 63 of the lower frame outer member 60 by welding or the like.

<Upper Member>

Figure 4:
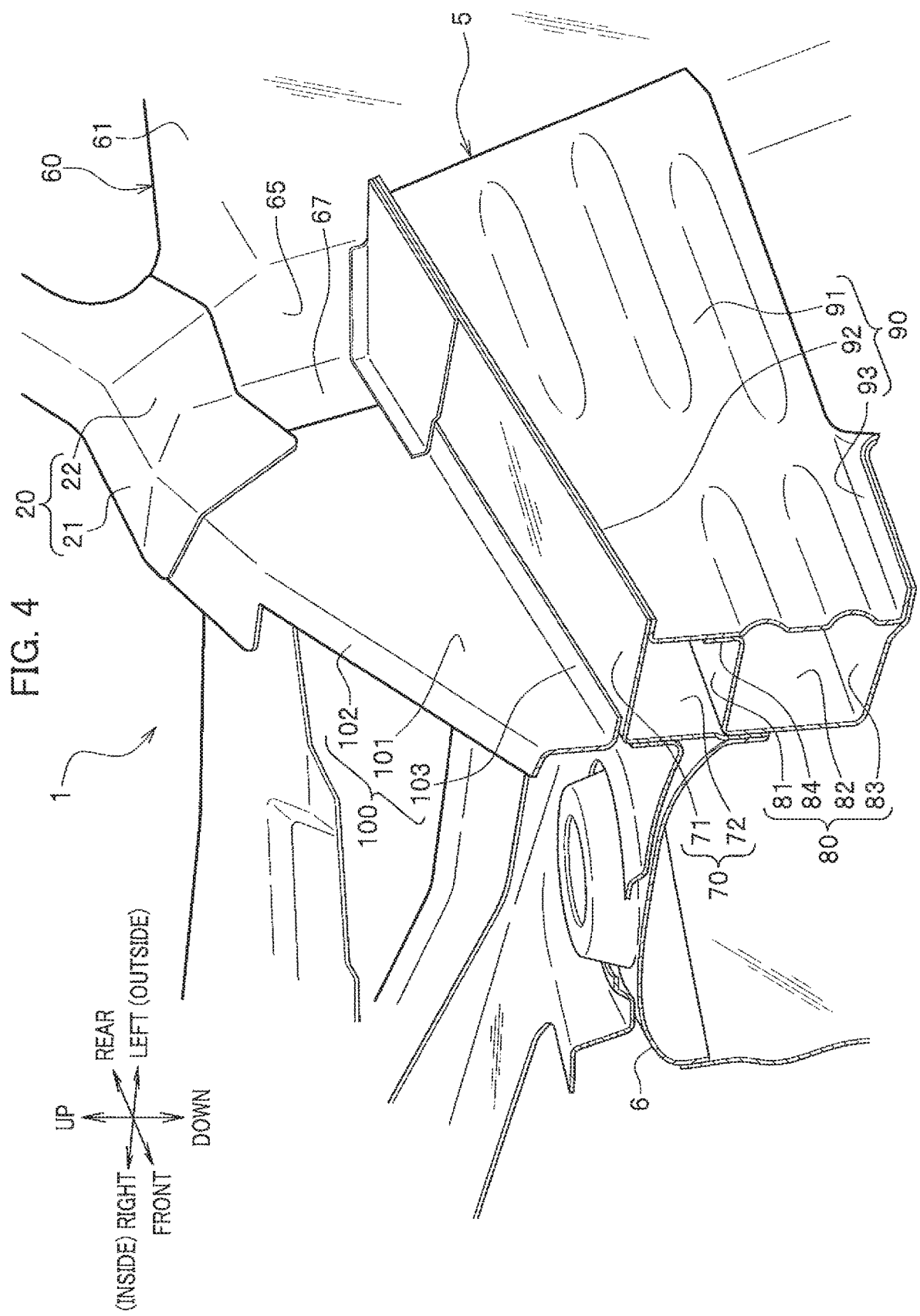
FIG. 4 is a perspective view showing a cross section taken along line IV-IV in FIG. 1.

As shown in FIG. 1 and FIG. 2, the upper member 5 is a structural member (skeleton member) made of metal, or made of fiber reinforced plastics, which is provided to extend in the front-rear direction above the wheel house WH for a front wheel of the vehicle. Provided at the inner side in the vehicle width direction of and below the upper member 5 is a damper housing 6 that houses therein a damper on which the front wheel of the vehicle is suspended. As shown in FIG. 4, the upper member 5 is provided with an inner upper member 70, an inner lower member 80, and an outer member 90.

<<Inner Upper Member>>

The inner upper member 70 is a metal member or a fiber reinforced plastics member that is integrally provided with an upper wall part 71 composing an upper wall of the upper member 5, and an inner wall part 72 provided to extend downward from an inner end in the vehicle width direction of the upper wall part 71 and composing an upper part of an inner wall of the upper member 5.

<<Inner Lower Member>>

The inner lower member 80 is a metal member or a fiber reinforced plastics member that is integrally provided with an upper wall part 81, an inner wall part 82 provided to extend downward from an inner end in the vehicle width direction of the upper wall part 81 and composing a lower part of the inner wall of the upper member 5, a lower wall part 83 provided to extend outward in the vehicle width direction from a lower end of the inner wall part 82 and composing a lower wall of the upper member 5, and a flange part 84 provided to extend upward from an outer end in the vehicle width direction of the upper wall part 81.

<<Outer Member>>

The outer member 90 is a metal member or a fiber reinforced plastics member that is integrally provided with an outer wall part 91 composing an outer wall of the upper member 5, a flange part 92 provided to extend outward in the vehicle width direction from an upper end of the outer wall part 91, and a flange part 93 provided to extend outward in the vehicle width direction from a lower end of the outer wall part 91.

The outer end in the vehicle width direction of the upper wall part 71 of the inner upper member 70 is joined to the flange part 92 of the outer member 90 by welding or the like. The lower end of the inner wall part 72 of the inner upper member 70 is joined to the upper end of the inner wall part 82 of the inner lower member 80 by welding or the like. The flange part 84 of the inner lower member 80 is joined to a middle part in the height direction of the outer wall part 91 of the outer member 90 by welding or the like. The outer end in the vehicle width direction of the lower wall part 83 of the inner lower member 80 is joined to the flange part 93 of the outer member 90 by welding or the like.

<<Relationship Between Upper Member and Front Pillar>>

Figure 5:
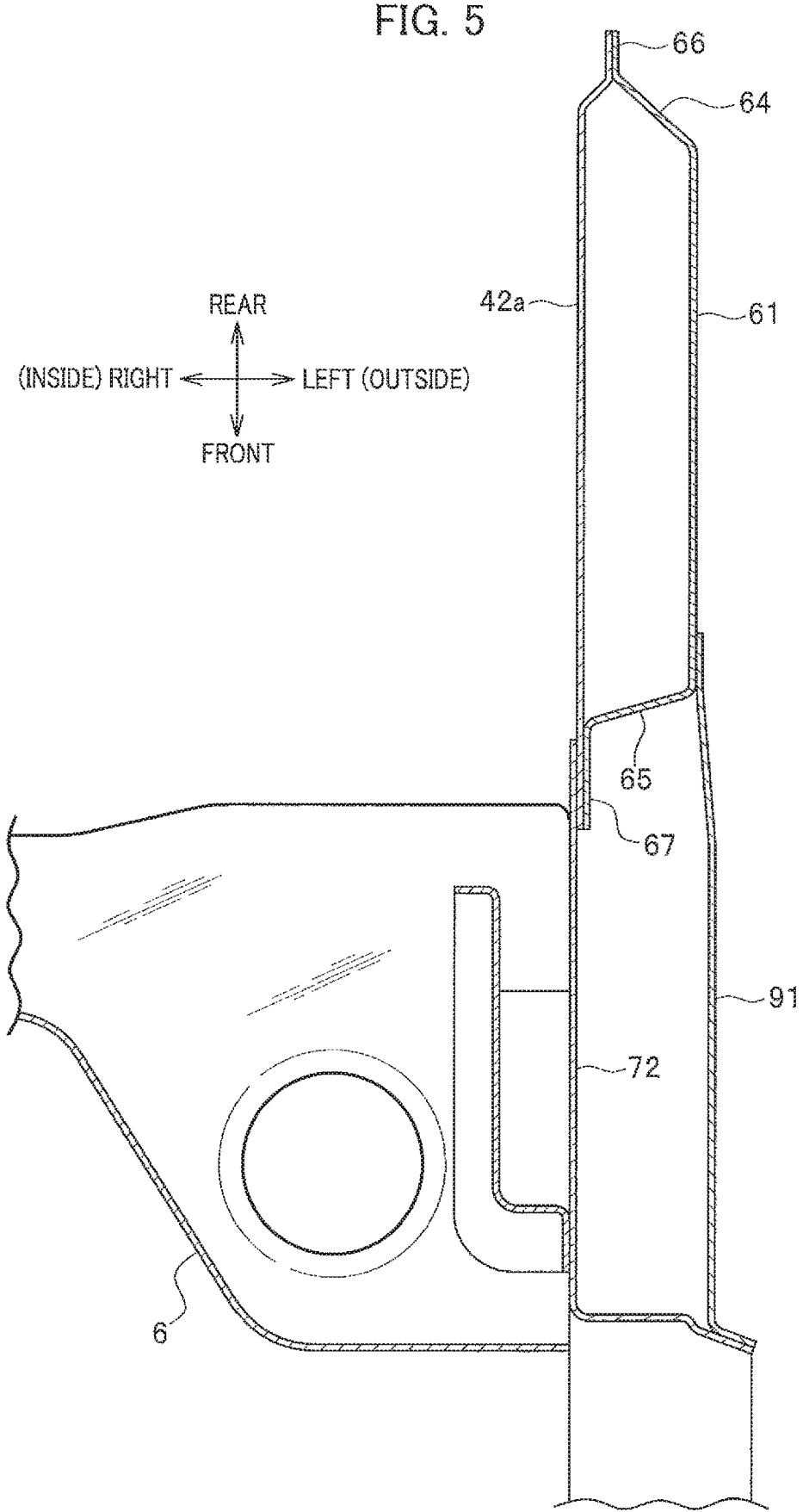
FIG. 5 is a plan view showing a cross section taken along line V-V in FIG. 1.

The upper member 5 and the lower frame 2 of the front pillar are provided to overlap each other when viewed from the front. More specifically, as shown in FIG. 5, the inner wall part of the upper member 5, namely, the inner wall part 72 of the inner upper member 70 and the inner wall part 82 of the inner lower member 80, and the inner wall part of the front pillar, namely, the inner wall parts 41a, 42a of the inner member 40, are provided to be continued each other in the front-rear direction.

Moreover, the respective rear ends of the upper wall part 71 and the inner wall part 72 of the inner upper member 70 and the lower wall part 83 of the inner lower member 80 abut on the front wall part 65 of the lower frame outer member 60 of the lower frame 2.

This structure allows a load input to the upper member 5 in front collision of the vehicle to be suitably transmitted mainly to the lower frame 2 of the front pillar.

<Bracket>

As shown in FIG. 4, the bracket 100 is a metal member or a fiber reinforced plastics member that is provided between the upper member 5 and the front pillar. More specifically, in the vehicle body front structure 1, a corner part is formed by the A-pillar 3, the lower frame 2, and the rear end of the upper member 5 provided to extend in the front-rear direction, and the bracket 100 is provided to fill in the corner part. The bracket 100 is connected to the lower end of the A-pillar 3 and provided to extend frontward from the A-pillar 3, and adapted to damp part of a load input to the upper member 5 in front collision of the vehicle to transmit a damped load to the A-pillar 3. Moreover, the bracket 100 allows an upper part thereof to be provided at the front side of the lower end of the A-pillar 3 to be connected to the lower end of the A-pillar 3, and allows a lower part thereof to be provided at the front side of (the upper end of) the front end of the lower frame 2 to be connected to the front end of the lower frame 2. The bracket 100 is integrally provided with an outer wall part 101 provided to extend in the front-rear direction, an upper wall part 102 provided to extend inward in the vehicle width direction from an upper end of the outer wall part 101, and a flange part 103 provided to extend outward in the vehicle width direction from a lower end of the outer wall part 101.

The upper part of the rear end of the outer wall part 101 is joined to the front end of the outer wall part 22 of the lower end member 20 by welding or the like. The lower part of the rear end of the outer wall part 101 is joined to the flange part 67 of the lower frame outer member 60 by welding or the like. The rear end of the upper wall part 102 is joined to the front end of the upper wall part 21 of the lower end member 20 by welding or the like. The flange part 103 is joined to the upper wall part 71 of the inner upper member 70 by welding or the like. The part at which the flange part 103 and the upper member 5 are welded to each other is located above the outer end in the vehicle width direction of the damper housing 6.

The outer wall part 101 of the bracket 100 has a nearly triangular shape such that it becomes wider as going toward the rear side in side view. The bracket 100 is adapted to transmit part of a front collision load input to the upper member 5 in front collision of the vehicle to the A-pillar 3. The bracket 100 is configured to be more fragile to the front collision load than the A-pillar (assembly of the A-pillar body 10 and the stiffener 30), by selection of materials, thicknesses and the like. That is to say, strength of the bracket 100 is set to be lower than strength of the A-pillar 3. Note that in the present embodiment, the bracket 100 is configured to be more fragile to the front collision load than the upper member 5, the lower frame 2 and the A'-pillar 4.

Moreover, in the present embodiment, the strengths of the bracket 100, the lower end member 20 and the A-pillar 3 (assembly of the A-pillar body 10 and the stiffener 30) are set to satisfy the relationship expressed by:

A-pillar 3>lower end member 20>bracket 100, where the lower end member 20 has a strength more close to that of the A-pillar 3 than that of the bracket 100.

The vehicle body front structure 1 according to the embodiment of the present invention allows the strength of the bracket 100 to be lower than the strength of the A-pillar 3, thus allowing the bracket 100, in front collision of the vehicle, to preferentially collapse in the front-rear direction to crush or to be deformed by bending, thereby making it possible for the bracket 100 to suitably absorb a front collision load to secure a stroke and to suppress bending of the A-pillar 3.

Moreover, the vehicle body front structure 1 allows the bracket 100 to be fixed to the upper end of the rear end of the upper member 5 above the damper housing 6, thus making it possible to suitably secure mounting strength of the bracket 100. The vehicle body front structure 1 also allows the bracket 100 to be provided above the damper housing 6 having a relatively high strength, thus making it possible to further suppress bending of the A-pillar 3.

Further, the vehicle body front structure 1 allows the upper member 5 and the lower frame 2 to be provided so as to be continued each other in the front-rear direction, thus making it possible to suitably transmit most of a front collision load input to the upper member 5 in front collision of the vehicle to the lower frame 2 and thus to suitably suppress bending of the A-pillar 3.

Moreover, the vehicle body front structure 1 allows the A-pillar 3 to be configured separately from the A'-pillar 4 and the lower frame 2, thus making it possible to improve moldability of the A-pillar 3 to suitably secure a visual field for the driver. The vehicle body front structure 1 also allows the A-pillar 3 to be configured by combining two members of the inner member and the outer member together, thus making it possible to suitably secure strength of the A-pillar 3.

Furthermore, the vehicle body front structure 1 allows the A-pillar 3 to be formed to be thinner than the A'-pillar 4, and allows the tensile strength of the A-pillar 3 to be set to be greater than the tensile strength of the A'-pillar 4, thus making it possible to suitably secure a visual field for the occupant and to suitably secure an inflating force of the air bag device.

Although the embodiment of the present invention has been described above, the present invention is not limited to the above embodiment, and can be appropriately modified within the scope not departing from the gist of the present invention.

For example, a configuration may be adopted such that the outer member of the A-pillar 3 is formed integrally with the lower frame 2 and/or the outer member of the A'-pillar 4, and the inner member of the A-pillar 3 is formed integrally with the lower frame 2 and/or the inner member of the A'-pillar 4. Moreover, a configuration may be adopted such that the lower frame 2 is formed separately from the A-pillar 3 and the A'-pillar 4. That is, a configuration may be adopted such that the A-pillar 3, the A'-pillar 4 and the lower frame 2 are separately formed, respectively, and these members are connected with each other to compose the front pillar.

Although embodiments of the present invention have been described and illustrated in detail, the disclosed embodiments are made for purposes of illustration and example only and not limitation. The scope of the present invention should be interpreted by terms of the appended claims.

DESCRIPTION OF REFERENCE SIGNS

1: Vehicle body front structure; 2: Lower frame (Front pillar); 3: A-pillar (First front pillar; Front pillar); 4: A'-pillar (Second front pillar; Front pillar); 5: Upper member; 6: Damper housing; 10: A-pillar body (First front pillar outer member); 30: Stiffener (First front pillar inner member); 100: Bracket; WH: Wheel house

What is claimed is:
1. A vehicle body front structure comprising:
   a front pillar that includes a first front pillar provided to extend in an up-down direction, a second front pillar provided to extend in the up-down direction in the rear of the first front pillar, and a lower frame disposed between lower ends of the first front pillar and the second front pillar; and
   a bracket that is connected to the lower end of the first front pillar and provided to extend frontward from the lower end of the first front pillar, wherein
   the first front pillar is formed thinner than the second front pillar, and strength of the bracket is set to be lower than strength of the first front pillar.
2. The vehicle body front structure according to claim 1, wherein
   the bracket is fixed to an upper member above a damper housing.
3. The vehicle body front structure according to claim 1, wherein
   the first front pillar is configured separately from the second front pillar and the lower frame, and formed by combination of a first front pillar inner member and a first front pillar outer member.
4. The vehicle body front structure according to claim 2, wherein
   the first front pillar is configured separately from the second front pillar and the lower frame, and formed by combination of a first front pillar inner member and a first front pillar outer member.
5. The vehicle body front structure according to claim 1, wherein
   strength of the first front pillar is set to be greater than strength of the second front pillar.
6. The vehicle body front structure according to claim 2, wherein
   strength of the first front pillar is set to be greater than strength of the second front pillar.
7. The vehicle body front structure according to claim 2, wherein
   the upper member is provided above a wheel house and connected to the lower frame, and
   the upper member and the lower frame are provided to be continued in a front-rear direction.
8. The vehicle body front structure according to claim 7, wherein the first front pillar is configured separately from the second front pillar and the lower frame, and formed by combination of a first front pillar inner member and a first front pillar outer member.

9. The vehicle body front structure according to claim 7, wherein strength of the first front pillar is set to be greater than strength of the second front pillar.

10. The vehicle body front structure according to claim 8, wherein strength of the first front pillar is set to be greater than strength of the second front pillar.

\* \* \* \* \*